US008880391B2

(12) United States Patent
Sekine et al.

(10) Patent No.: US 8,880,391 B2
(45) Date of Patent: Nov. 4, 2014

(54) NATURAL LANGUAGE PROCESSING APPARATUS, NATURAL LANGUAGE PROCESSING METHOD, NATURAL LANGUAGE PROCESSING PROGRAM, AND COMPUTER-READABLE RECORDING MEDIUM STORING NATURAL LANGUAGE PROCESSING PROGRAM

(75) Inventors: Satoshi Sekine, Shinagawa-ku (JP); Hajime Wakahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/581,660

(22) PCT Filed: Nov. 28, 2011

(86) PCT No.: PCT/JP2011/077418
§ 371 (c)(1),
(2), (4) Date: Aug. 29, 2012

(87) PCT Pub. No.: WO2012/081386
PCT Pub. Date: Jun. 21, 2012

(65) Prior Publication Data
US 2013/0262085 A1    Oct. 3, 2013

Related U.S. Application Data

(60) Provisional application No. 61/424,283, filed on Dec. 17, 2010.

(51) Int. Cl.
*G06F 17/27*  (2006.01)
*G06F 17/28*  (2006.01)

(52) U.S. Cl.
CPC ............ *G06F 17/28* (2013.01); *G06F 17/2755* (2013.01)
USPC ............................................. 704/9

(58) Field of Classification Search
USPC ....................................... 704/1–10
See application file for complete search history.

(56) References Cited

U.S. PATENT DOCUMENTS

| 5,331,556 | A | * | 7/1994 | Black et al. | 704/9 |
| 5,521,816 | A | * | 5/1996 | Roche et al. | 704/9 |
| 5,794,177 | A | * | 8/1998 | Carus et al. | 704/9 |

FOREIGN PATENT DOCUMENTS

JP    2002-297589 A    10/2002

OTHER PUBLICATIONS

International Search Report of PCT/JP2011/077418 dated Feb. 14, 2012.

(Continued)

*Primary Examiner* — Abul Azad
(74) *Attorney, Agent, or Firm* — Sughrue Mion, PLLC (57) ABSTRACT

A natural language processing apparatus includes a result acquisition unit that acquires a plurality of analysis results indicating parts of speech of morphemes contained in one or more common sentences from a plurality of types of morphological analyzers, a pattern acquisition unit that detects a common segmentation point in the plurality of analysis results, extracts one or more parts of speech corresponding to a character string segmented at the common segmentation point from each of the analysis results, and acquires a set of the parts of speech as a part-of-speech differing pattern, and a candidate specifying unit that extracts the part-of-speech differing pattern with the number of appearances being equal to or less than a predetermined threshold and specifies the character string corresponding to the extracted part-of-speech differing pattern as a character string containing a candidate for an unknown word.

9 Claims, 5 Drawing Sheets

(56) References Cited

OTHER PUBLICATIONS

International Preliminary Report on Patentability and Written Opinion dated Jun. 27, 2013, issued in International Application No. PCT/JP2011/077418.

* cited by examiner

RESULT>>========================================== analyzer_1>>
私(watashi)　noun_pronoun analyzer_2>>
私(watashi)　noun_common analyzer_3>>
私(watashi)　pronoun ===chunked========================================== analyzer_1>>
は(ha)　particle_dependency
うっ(ut)　verb_main
とろりん(tororin)　noun_proper
と(to)　particle_case analyzer_2>>
はう(hau)　verb
っと(tto)　particle_case
ろ(ro)　noun_common
りんと(rinto)　adjective analyzer_3>>
は(ha)　particle_dependency
うっ(ut)　exclamation_filler
とろり(torori)　adverb
ん(n)　exclamation_filler
と(to)　particle-case ===chunked========================================== analyzer_1>>
し(shi)　verb_main
た(ta)　aux analyzer_2>>
した(shita)　suffix_verbal analyzer_3>>
し(shi)　verb_aux
た(ta)　aux ===chunked==========================================

Fig.3

| NUMBER OF APPEARANCES | NUMBER OF TYPES OF PART-OF-SPEECH DIFFERING PATTERNS |
|---|---|
| 1 | 2985 |
| 2 | 733 |
| 3 | 394 |
| 4 | 235 |
| 5 | 163 |
| 6 | 122 |
| 7 | 101 |
| 8 | 70 |
| 9 | 64 |
| 10 | 53 |
| 11 | 41 |
| 12 | 46 |
| 13-20 | 193 |
| 21-50 | 230 |
| 51-100 | 118 |
| 101-500 | 160 |
| 501-1000 | 42 |
| 1001- | 79 |

Fig.4

| NUMBER OF APPEARANCES | UNKNOWN WORD EXISTS IN TWO OR LESS ANALYZERS | UNKNOWN WORD EXISTS IN THREE OR MORE ANALYZERS |
|---|---|---|
| 1 | 10 | 0 |
| 2 | 9 | 3 |
| 3 | 6 | 1 |
| 4 | 2 | 1 |
| 5 | 1 | 1 |
| 6 | 3 | 2 |
| 7 | 2 | 0 |
| 8 | 6 | 1 |
| 9 | 4 | 2 |
| 10 | 10 | 2 |
| 11 | 3 | 0 |
| 12 | 5 | 2 |
| 13-20 | 2 | 1 |
| 21-50 | 1 | 0 |
| 51-100 | 0 | 0 |
| 101-500 | 1 | 0 |
| 501-1000 | 0 | 0 |
| 1001- | 0 | 0 |

Fig.5

NATURAL LANGUAGE PROCESSING APPARATUS, NATURAL LANGUAGE PROCESSING METHOD, NATURAL LANGUAGE PROCESSING PROGRAM, AND COMPUTER-READABLE RECORDING MEDIUM STORING NATURAL LANGUAGE PROCESSING PROGRAM

CROSS REFERENCE TO RELATED APPLICATIONS

This application is a National Stage of International Application No. PCT/JP2011/077418 filed Nov. 28, 2011, claiming priority based on U.S. Provisional Patent Application No. 61/424,283 filed Dec. 17, 2010, the contents of all of which are incorporated herein by reference in their entirety.

TECHNICAL FIELD

One embodiment of the present invention relates to a natural language processing apparatus, a natural language processing method, a natural language processing program, and a computer-readable recording medium storing the natural language processing program.

BACKGROUND ART

Natural language processing (natural language analysis) on text data has been performed for various purposes. For example, natural language processing is sometimes performed on articles such as reviews and blogs written by general users and registered in web services.

Morphological analysis is one technique of natural language processing. Regarding the morphological analysis, a method to extract morphemes that do not match any words registered in a dictionary as unknown words is disclosed in the following Patent Literature 1.

CITATION LIST

Patent Literature

PTL 1: JP 2002-297589 A

SUMMARY OF INVENTION

Technical Problem

However, the method that simply determines all words that do not match any words in a dictionary as unknown words as described in the above Patent Literature 1 fails to efficiently find unknown words.

It is thus desirable to find unknown words efficiently.

Solution to Problem

A natural language processing apparatus according to one embodiment of the present invention includes a result acquisition means for acquiring a plurality of analysis results indicating parts of speech of morphemes contained in one or more common sentences, the analysis results obtained by analyzing the one or more common sentences using a plurality of types of morphological analyzers, a pattern acquisition means for detecting a common segmentation point in the plurality of analysis results acquired by the result acquisition means, extracting one or more parts of speech corresponding to a character string segmented at the common segmentation point from each of the analysis results, and acquiring a set of the extracted one or more parts of speech as a part-of-speech differing pattern, a storage means for storing the part-of-speech differing pattern acquired by the pattern acquisition means together with the number of appearances of the part-of-speech differing pattern, and a candidate specifying means for extracting the part-of-speech differing pattern with the number of appearances being equal to or less than a predetermined threshold from the storage means and specifying the character string corresponding to the extracted part-of-speech differing pattern as a character string containing a candidate for an unknown word.

A natural language processing method according to one embodiment of the present invention is a natural language processing method executed by a natural language processing apparatus, which includes a result acquisition step of acquiring a plurality of analysis results indicating parts of speech of morphemes contained in one or more common sentences, the analysis results obtained by analyzing the one or more common sentences using a plurality of types of morphological analyzers, a pattern acquisition step of detecting a common segmentation point in the plurality of analysis results acquired in the result acquisition step, extracting one or more parts of speech corresponding to a character string segmented at the common segmentation point from each of the analysis results, and acquiring a set of the extracted one or more parts of speech as a part-of-speech differing pattern, a storage step of storing the part-of-speech differing pattern acquired in the pattern acquisition step together with the number of appearances of the part-of-speech differing pattern into a storage means, and a candidate specifying step of extracting the part-of-speech differing pattern with the number of appearances being equal to or less than a predetermined threshold from the storage means and specifying the character string corresponding to the extracted part-of-speech differing pattern as a character string containing a candidate for an unknown word.

A natural language processing program according to one embodiment of the present invention causes a computer to function as a result acquisition means for acquiring a plurality of analysis results indicating parts of speech of morphemes contained in one or more common sentences, the analysis results obtained by analyzing the one or more common sentences using a plurality of types of morphological analyzers, a pattern acquisition means for detecting a common segmentation point in the plurality of analysis results acquired by the result acquisition means, extracting one or more parts of speech corresponding to a character string segmented at the common segmentation point from each of the analysis results, and acquiring a set of the extracted one or more parts of speech as a part-of-speech differing pattern, a storage means for storing the part-of-speech differing pattern acquired by the pattern acquisition means together with the number of appearances of the part-of-speech differing pattern, and a candidate specifying means for extracting the part-of-speech differing pattern with the number of appearances being equal to or less than a predetermined threshold from the storage means and specifying the character string corresponding to the extracted part-of-speech differing pattern as a character string containing a candidate for an unknown word.

A computer-readable recording medium according to one embodiment of the present invention stores a natural language processing program causing a computer to function as a result acquisition means for acquiring a plurality of analysis results indicating parts of speech of morphemes contained in one or more common sentences, the analysis results obtained by analyzing the one or more common sentences using a plurality of types of morphological analyzers, a pattern acquisition means for detecting a common segmentation point in the plurality of analysis results acquired by the result acquisition means, extracting one or more parts of speech corresponding to a character string segmented at the common segmentation point from each of the analysis results, and acquiring a set of the extracted one or more parts of speech as a part-of-speech differing pattern, a storage means for storing the part-of-speech differing pattern acquired by the pattern acquisition means together with the number of appearances of the part-of-speech differing pattern, and a candidate specifying means for extracting the part-of-speech differing pattern with the number of appearances being equal to or less than a predetermined threshold from the storage means and specifying the character string corresponding to the extracted part-of-speech differing pattern as a character string containing a candidate for an unknown word.

The inventors have made an intensive study based on the assumption that when a sentence as a target of morphological analysis contains an unknown word, a plurality of different morphological analyzers give different analysis results around the unknown word. Based on this assumption, the inventors extracted a large amount of part-of-speech differing patterns from a large amount of sentences using a plurality of types of morphological analyzers and then analyzed the obtained part-of-speech differing patterns on the basis of their frequency. Consequently, the inventors have found that there is a tendency that an unknown word is contained in character strings corresponding to the part-of-speech differing patterns with low frequency.

According to the above embodiment, on the basis of analysis results of one or more common sentences by a plurality of types of morphological analyzers, part-of-speech differing patterns of character strings segmented at common points (a set of parts of speech corresponding to the character strings, which is obtained by the plurality of morphological analyzers) are obtained. The part-of-speech differing patterns are stored together with their number of appearances. Then, the character strings corresponding to the part-of-speech differing patterns whose number of appearances is equal to or less than a predetermined threshold are specified as those containing candidates for an unknown word. In this manner, by automatically extracting the character strings that are estimated to be likely to contain an unknown word, it is possible to limit the search range for an unknown word and thereby efficiently find an unknown word.

In a natural language processing apparatus according to another embodiment, contents of a dictionary stored in each morphological analyzer may be different among the plurality of types of morphological analyzers In this manner, by using a plurality of morphological analyzers having dictionaries with different contents from one another, it is possible to more efficiently extract character strings that actually contain an unknown word, which allows more efficient finding of an unknown word.

In a natural language processing apparatus according to another embodiment, the number of words included in the dictionary may be different among the plurality of types of morphological analyzers.

In a natural language processing apparatus according to another embodiment, a system of the parts of speech included in the dictionary may be different among the plurality of types of morphological analyzers.

In a natural language processing apparatus according to another embodiment, a connection rule between words stored in each morphological analyzer may be different among the plurality of types of morphological analyzers.

In this manner, by using a plurality of morphological analyzers with different inter-word connection rules from one another, it is possible to more efficiently extract character strings that actually contain an unknown word, which allows more efficient finding of an unknown word.

In a natural language processing apparatus according to another embodiment, a score set for a connection between the words may be different among the plurality of types of morphological analyzers.

In a natural language processing apparatus according to another embodiment, a rule to apply a score for a connection between the words may be different among the plurality of types of morphological analyzers.

Advantageous Effects of Invention

According to one aspect of the present invention, because the search range for an unknown word is limited by automatically extracting character strings that are estimated to be likely to contain an unknown word, it is possible to efficiently find an unknown word.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First, the functions and configuration of a natural language processing apparatus 10 according to this embodiment are described with reference to FIGS. 1 to 4. The natural language processing apparatus 10 is a computer that executes natural language processing and connected with three morphological analyzers through a wired or wireless network. Note that the number of morphological analyzers may be any number as long as it is two or more.

Figure 1:
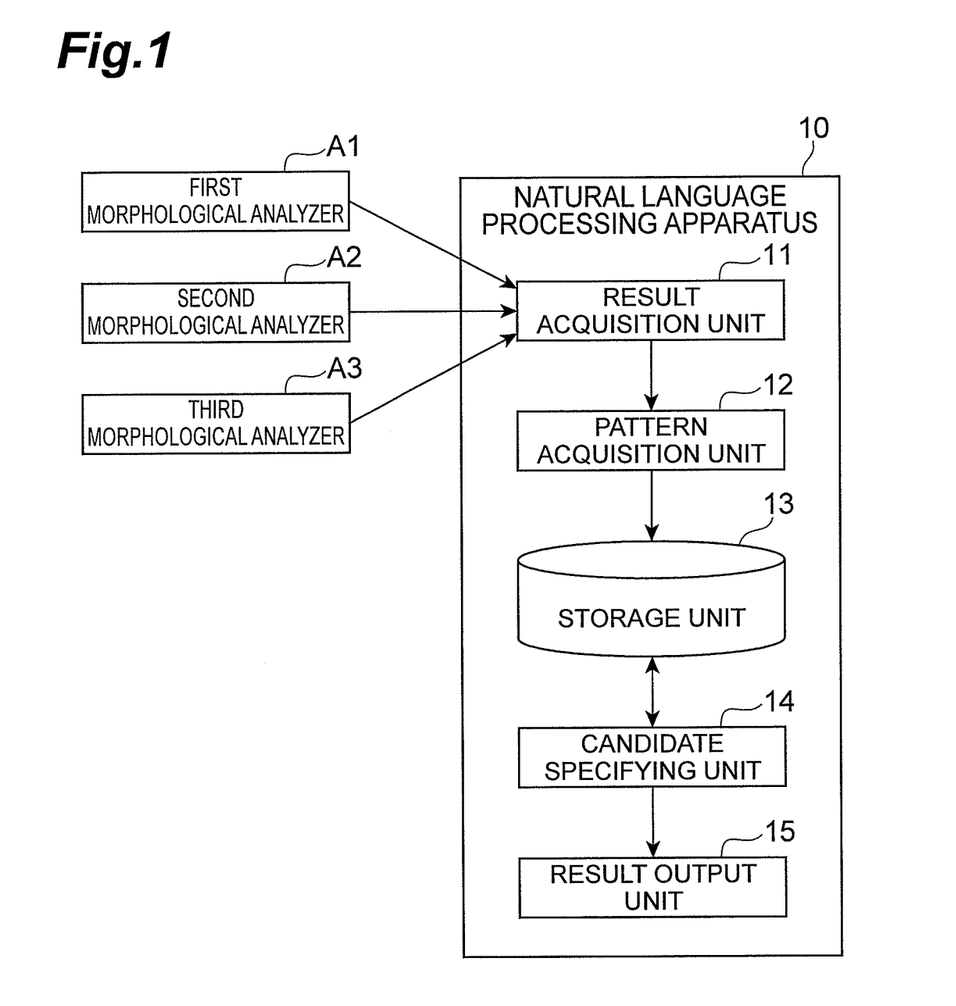
FIG. 1 is a block diagram showing a functional configuration of a natural language processing apparatus according to an embodiment.

The morphological analyzers are described firstly. A first morphological analyzer A1, a second morphological analyzer A2 and a third morphological analyzer A3 are computers that execute morphological analysis on one or more sentences. A target of morphological analysis may be one sentence, one set of sentences containing one or more sentences, or a plurality of sets of sentences.

A morpheme is the smallest semantically meaningful unit in a language. The morphological analysis is a process of segmenting a sentence into morphemes using a dictionary and identifying their grammatical attributes. A typical existing morphological analyzer has a dictionary that includes morphemes and part-of-speech information. For a word that is not contained in the dictionary, the morphological analyzer makes estimation by character type (in Japanese, Kanji, Hiragana, Katakana, number, alphabet etc.); however, it is difficult to accurately identify all morphemes without a dictionary. A word that does not appear in a dictionary for morphological analysis is called an unknown word in this specification.

Although it is important to increase the accuracy of a morphological analyzer by adding unknown words to a dictionary, a method of finding unknown words is not developed well enough. Basically, new unknown words emerge one after another, and a technique of finding unknown words is of great significance in a study of unknown word processing of a morphological analyzer.

A basic idea of this embodiment is based on the assumption that "when a sentence as a target of morphological analysis contains an unknown word, a plurality of different morphological analyzers give different analysis results around the unknown word". However, it is not always true that an unknown word exists when the output of each morphological analyzer is different from each other, and there is a case where the difference in output is just due to a difference in word definition or part-of-speech definition which is defined in each morphological analyzer.

In this embodiment, attention is given to the frequency of appearance of a part-of-speech differing pattern that is obtained by comparing analysis results obtained by a plurality of different morphological analyzers. This is on the ground of the following considerations.

Seeing a difference segment using the actual representation of a word is equal to seeing almost all analysis data, which is not efficient.

When there is an unknown word, it is considered that unique part-of-speech patterns are respectively made in different types of morphological analyzers.

In morphological analyzers, words that appear with high frequency should be already registered in a dictionary, and unknown words are considered to be contained in low-frequency patterns in often cases, and it is thus reasonable to discriminate on the basis of the frequency.

A plurality of different morphological analyzers (a plurality of types of morphological analyzers) are morphological analyzers in which both or one of the contents of a dictionary stored therein and an inter-word connection rule are different from one another. An example in which the contents of a dictionary are different includes the case where the number of words included or the system of parts of speech included differs among different morphological analyzers. An example in which the inter-word connection rule is different includes the case where a score set for a connection between words or a rule for applying the score (for example, cost minimization method, minimum morpheme number method, probability model etc.) differs among different morphological analyzers.

In this embodiment, each of the first to third morphological analyzers A1, A2 and A3 analyzes a large amount of sentences. Then, the natural language processing apparatus 10 extracts a large amount of part-of-speech differing patterns using results of the analysis and counts the number of appearances (the frequency of appearance) of each of the part-of-speech differing patterns. Then, the natural language processing apparatus 10 specifies character strings that contain candidates for an unknown word.

To perform this process, the natural language processing apparatus 10 includes, as functional elements, a result acquisition unit (result acquisition means) 11, a pattern acquisition unit (pattern acquisition means) 12, a storage unit (storage means) 13, a candidate specifying unit (candidate specifying means) 14, and a result output unit 15.

The natural language processing apparatus 10 is composed of a CPU that executes an operating system, an application program and the like, a main storage unit composed of ROM and RAM, an auxiliary storage unit composed of a hard disk or the like, a communication control unit composed of a network card or the like, an input unit such as a keyboard and a mouse, and an output unit such as a monitor. The functions of the natural language processing apparatus 10 are implemented by loading given software onto the CPU or the main storage unit, making the communication control unit, the input device, the output device and the like operate under control of the CPU, and performing reading and writing of data in the main storage unit or the auxiliary storage unit. The data and database required for processing are stored in the main storage unit or the auxiliary storage unit.

The result acquisition unit 11 is a means of acquiring analysis results obtained by analyzing one or more common sentence (which is hereinafter also referred to as "text") by the first to third morphological analyzers A1, A2 and A3. The analysis results are data indicating one or more morphemes contained in the text and the part of speech of each of the morphemes. The result acquisition unit 11 may receive the analysis results from the respective morphological analyzers or read the analysis results from the respective morphological analyzers. The result acquisition unit 11 outputs the acquired analysis results (results obtained from the three morphological analyzers) to the pattern acquisition unit 12.

The pattern acquisition unit 12 is a means of detecting a common segmentation point in a plurality of analysis results, extracting one or more parts of speech corresponding to a character string segmented at the point from each of the analysis results, and acquiring a set of the extracted one or more parts of speech as a part-of-speech differing pattern.

The pattern acquisition unit 12 detects segmentation points into morphemes sequentially from the beginning of a sentence for each of a plurality of input analysis results and specifies a segmentation point (common segmentation point) that is common among all the analysis results. Then, the pattern acquisition unit 12 extracts one or more parts of speech corresponding to each of character strings segmented at the common segmentation point from each of the analysis results, and acquires a set of all the extracted parts of speech as a part-of-speech differing pattern.

Figure 2:
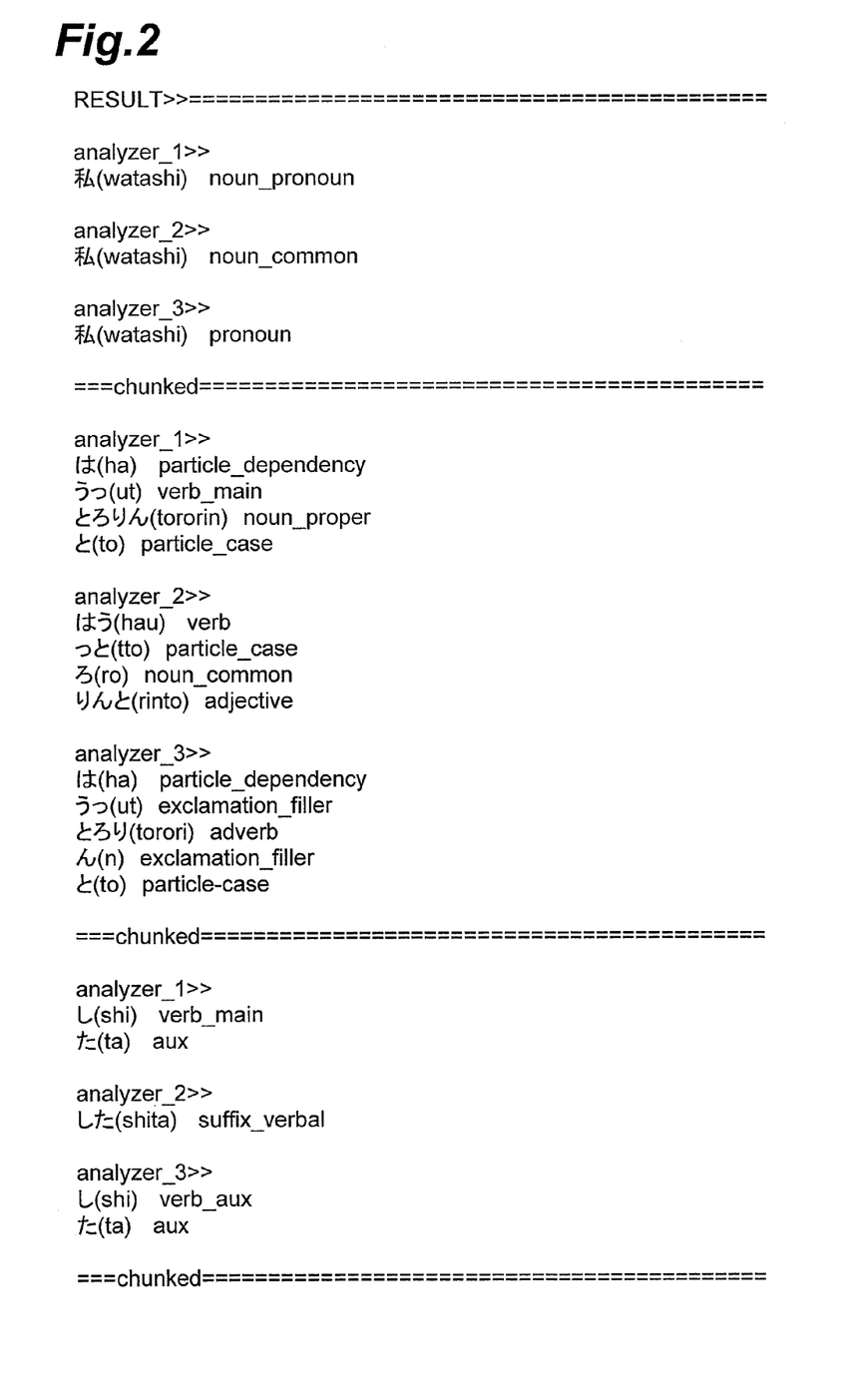
FIG. 2 is a diagram to explain acquisition of part-of-speech differing patterns.

An example of processing of the pattern acquisition unit 12 is described with reference to FIG. 2. FIG. 2 shows analysis results of a single Japanese sentence "watashi-ha-uttororin-to-shita" by the first to third morphological analyzers A1, A2 and A3 (which are indicated as analyzer_1, analyzer_2 and analyzer_3 in FIG. 2). Note that this Japanese sentence can be translated as "I was fascinated" in English. The word "uttororin" is an unknown word that corresponds to Japanese word "uttori" ("fascinated" in English). In FIG. 2, the part of speech such as "noun_pronoun" or "particle_dependency" is associated with each of word segments. Note that, although the part of speech is defined in one level like "pronoun" or in two levels like "particle_dependency" in the example of FIG. 2, the hierarchical levels of a part of speech may be defined arbitrarily in each morphological analyzer.

The above Japanese sentence is preferably analyzed (broken up) into "watashi/ha/uttororin/to/shita". However, because the word "uttororin" is an unknown word in all of the morphological analyzers A1, A2 and A3, analysis results for the word "uttororin" and adjacent words are different among the morphological analyzers as shown in FIG. 2.

The line "===chunked===" in FIG. 2 is a common segmentation point. Thus, in this case, the pattern acquisition unit 12 acquires three character strings "watashi", "hauttororinto" and "shita", which are segmented at the common segmentation points. Among those, the character string "hauttororinto" is analyzed as "ha/ut/tororin/to" in the first morphological analyzer A1, analyzed as "hau/tto/ro/rinto" in the second morphological analyzer A2, and analyzed as "ha/ut/torori/n/to" in the third morphological analyzer A3. Further, for the character strings "watashi" and "shita" also, the way of segmentation into morphemes and the setting of parts of speech are different among the morphological analyzers. In this manner, when an unknown word is contained in a sentence, false analysis such as oversegmentation and fragmentation is likely to occur. Further, it is likely that parts of speech are not correctly identified.

Then, the pattern acquisition unit 12 acquires a segment where a part-of-speech identification result differs among a plurality of morphological analyzers as a part-of-speech differing pattern. Specifically, the pattern acquisition unit 12 acquires a set of "noun_pronoun", "noun_common" and "pronoun", which is a result of analysis for the character string "watashi", as a part-of-speech differing pattern "noun_pronoun|noun_common|pronoun". Likewise, the pattern acquisition unit 12 acquires a part-of-speech differing pattern "particle_dependency, verb_main, noun_proper, particle_case|verb, particle_case, noun_common, adjective|particle_dependency, exclamation_filler, adverb, exclamation_filler, particle-case" which corresponds to the character string "hauttororinto". Further, the pattern acquisition unit 12 acquires a part-of-speech differing pattern "verb_main, aux|suffix_verbal|verb_aux, aux" which corresponds to the character string "shita". The symbol "|" indicates a segmentation among morphological analyzers.

After acquiring the part-of-speech differing patterns in this manner, the pattern acquisition unit 12 counts the number of appearances of each pattern up to that time and stores frequency data indicating the part-of-speech differing pattern and its number of appearances into the storage unit 13. Alternatively, the pattern acquisition unit 12 updates the frequency data in the storage unit 13 by incrementing the number of appearances corresponding to the acquired part-of-speech differing pattern by one. Further, the pattern acquisition unit 12 stores character string data indicating the part-of-speech differing pattern and the character string corresponding to the pattern into the storage unit 13. For example, the pattern acquisition unit 12 stores the character string data in which the character string "hauttororinto" and the part-of-speech differing pattern "particle_dependency, verb_main, noun_proper, particle_case|verb, particle_case, noun_common, adjective|particle_dependency, exclamation_filler, adverb, exclamation_filler, particle-case" are associated with each other into the storage unit 13.

The storage unit 13 is a means of storing the frequency data and the character string data. Specifically, the storage unit 13 stores the part-of-speech differing patterns together with their number of appearances, and further stores the character strings corresponding to the part-of-speech differing patterns.

The candidate specifying unit 14 is a means of extracting the part-of-speech differing pattern whose number of appearances is equal to or lower than a predetermined threshold from the storage unit 13 and specifying the character string corresponding to the extracted part-of-speech differing pattern as a character string that contains a candidate for an unknown word.

Figure 3:
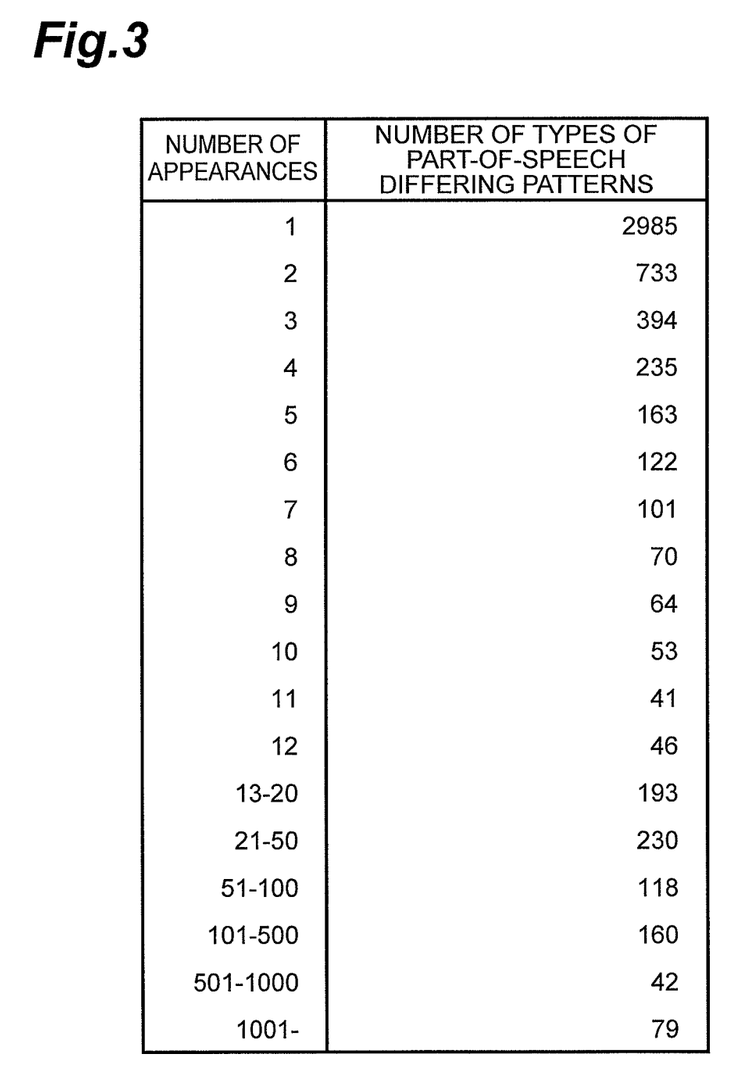
FIG. 3 is a diagram showing an example of a summation result of frequency data.

Although a threshold to be used can be decided arbitrarily, one guidelines to decide a threshold are described hereinbelow. As an example, ten thousand articles were acquired from a certain web site, and about forty-five thousand sentences (the average number of characters per sentence is approximately 30.9) that form those articles were processed by four morphological analyzers, so that the frequency data were acquired. Then, the number of types of part-of-speech differing patterns was summarized with respect to each number of appearances based on the frequency data and, consequently, the result shown in FIG. 3 was obtained. In the example of FIG. 3, the total number of part-of-speech differing patterns was 5,829.

Figure 4:
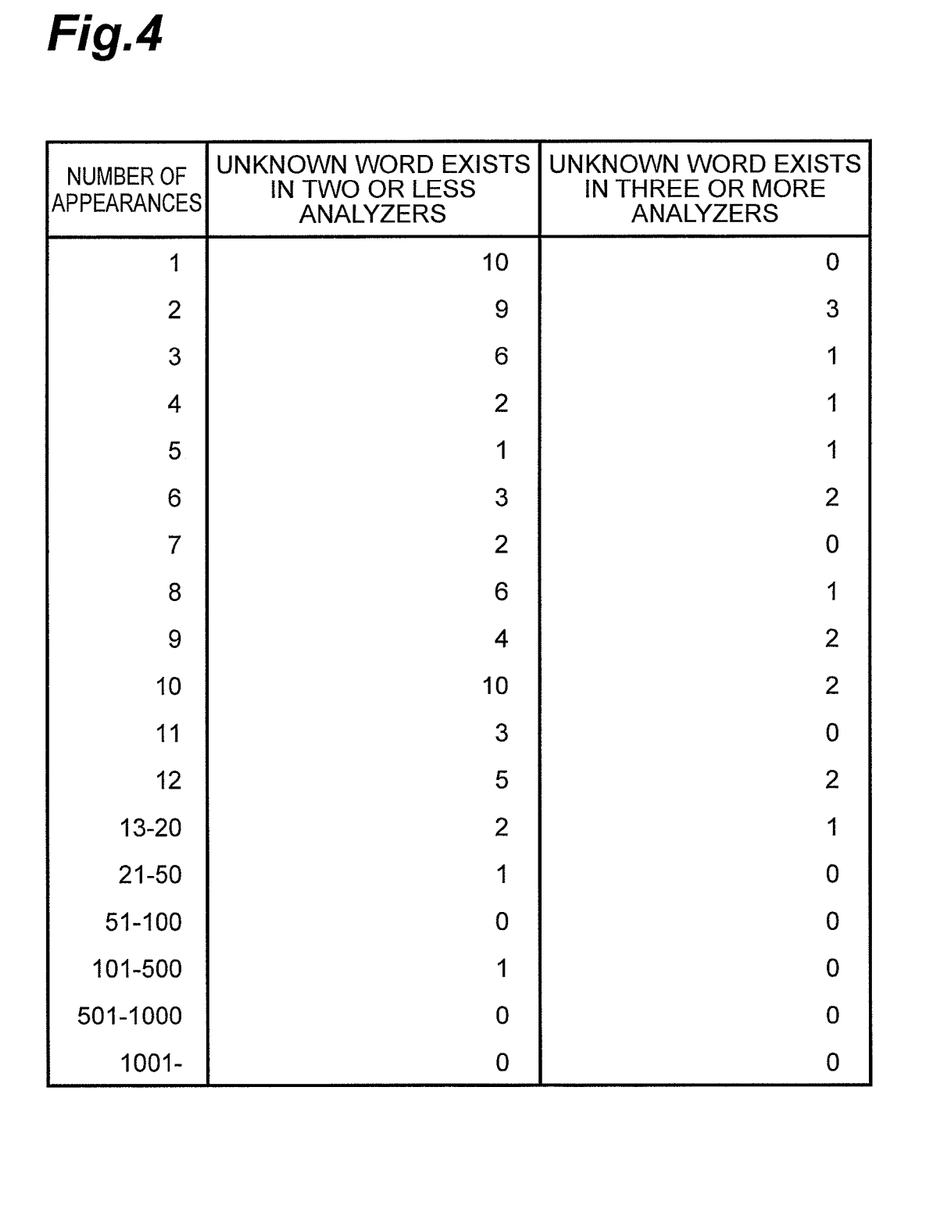
FIG. 4 is a diagram showing an example of an analysis result of part-of-speech differing patterns on the basis of frequency data.

After that, 20 patterns were randomly extracted from those part-of-speech differing patterns with respect to each frequency of appearance, then the presence or absence of an unknown word was determined, and, consequently, the result shown in FIG. 4 was obtained. The result of FIG. 4 shows that, while many unknown words are contained in the part-of-speech differing patterns with a small number of appearances (for example, 1, 2 etc.), the probability that an unknown word is contained in the part-of-speech differing patterns with the number of appearances of more than 20 is very low. Accordingly, it can be presumed that it is possible to find an unknown word efficiently by checking character strings corresponding to the part-of-speech differing patterns with a small number of appearances, and therefore the threshold may be set to 20. Note that, however, another value (for example, 2, 3, 10 etc.) may be set as a threshold based on the result of FIG. 4.

In the case where the threshold is set to 20 in accordance with the example of FIGS. 3 and 4, the candidate specifying unit 14 refers to the storage unit 13 and extracts the character strings corresponding to 5,200 part-of-speech differing patterns with the number of appearances of 20 or less. The character strings that contain candidates for an unknown word (character strings likely to contain an unknown word) are thereby specified. The candidate specifying unit 14 outputs the extracted (specified) character strings to the result output unit 15.

The result output unit 15 is a means of outputting the character strings that contain candidates for an unknown word by a predetermined method. For example, the result output unit 15 may display the character strings on a monitor or store them into a recording medium such as a database. Further, the result output unit 15 may print out the character strings by a printer or transmit them to another device through a network.

A user can analyze the character strings (target character strings) narrowed down in the above way and thereby obtain an unknown word. As one technique, a user classifies the target character strings into the following six groups, not just classifying them according to whether or not to contain an unknown word.

(Criterion 1) Those in which only part-of-speech identification is false (Criterion 2) Those determined as being oversegmentation into morphemes (Criterion 3) Those determined as containing an unknown word (Criterion 4) Those determined as not containing an unknown word (Criterion 5) Those determined as being an unknown word including the adjacent part of the output difference-detected segment (Criterion 6) Those being an input-dependent result such as spell error or sentence segmentation error Criterion 1 is the case where, although word segmentation is common among the morphological analyzers, there is an error in identification of parts of speech. Criterion 2 is the case where, although word segmentation and part-of-speech identification are seemingly correct because a compound word composed of a plurality of words is divided into components, it is determined that the meaning of a compound word is lost. Criterion 3 is the case, other than the cases of Criteria 1 and 2, where it is determined that the analysis result is not appropriate as the minimum meaningful unit because an item completely different from that in a dictionary is used as a morpheme. Criterion 4 is the case where there is no error in any word segmentation and part-of-speech identification, and it is determined that the analysis result is appropriate as the minimum meaningful unit. Criterion 5 is the case where, although only a part of the character string which should be treated as one unknown word is extracted as a segment corresponding to the part-of-speech differing pattern, it is necessary to take the adjacent character string into consideration. For example, this is the case where, for the expected unknown word "uttororin", only a part corresponding to "utto" is extracted as the character string corresponding to the part-of-speech differing pattern. Criterion 6 is the case where there is less significance for the character string to be extracted as an unknown word, thus not selected as a target to analysis.

A user can evaluate the character strings that match the criteria 3 and 5 among the above six criteria as those containing an unknown word. Note that the target character strings output by the result output unit 15 may be further processed by a computer or processed manually. The evaluation on the basis of the above six criteria may be made by an arbitrary way.

Figure 5:
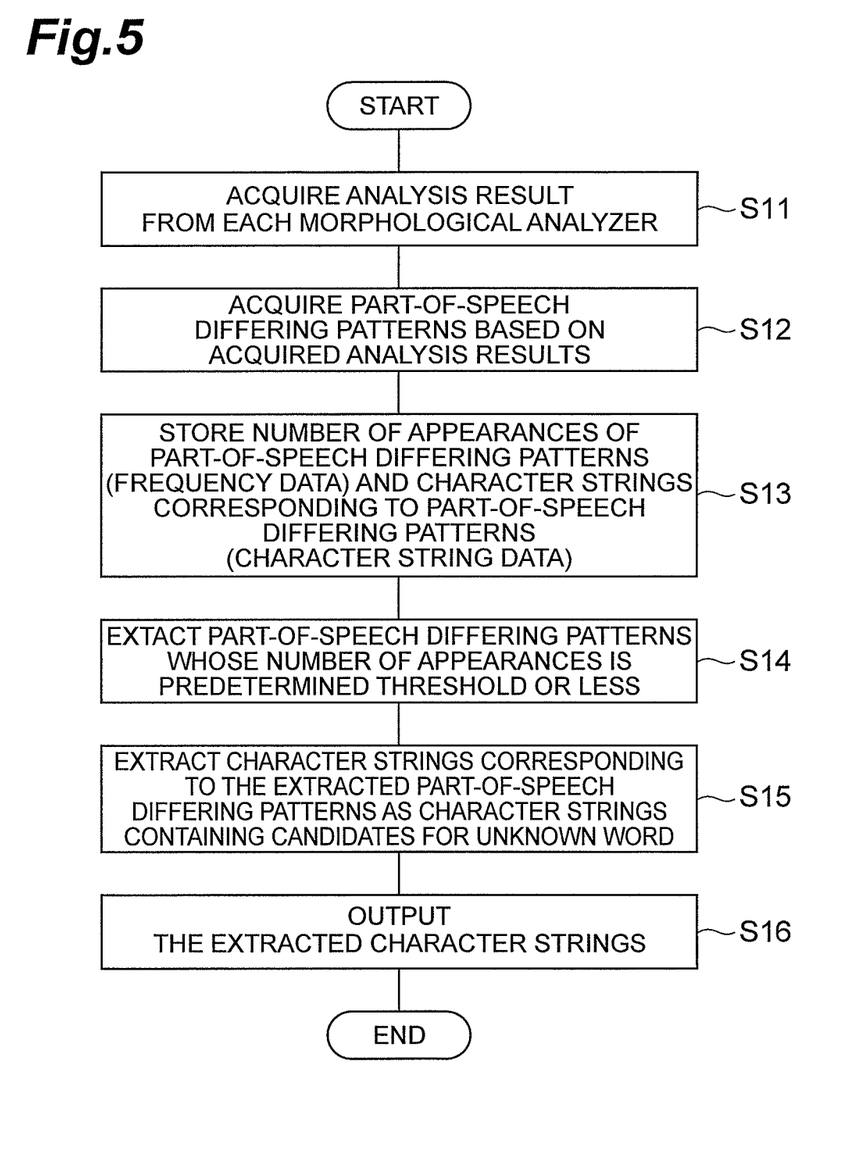
FIG. 5 is a flowchart showing an operation of the natural language processing apparatus shown in FIG. 1.

The operation of the natural language processing apparatus (natural language processing method) shown in FIG. 1 is described hereinafter with reference to FIG. 5. First, the result acquisition unit 11 acquires analysis results from the morphological analyzers A1, A2 and A3 (Step S11, Result acquisition step). Next, the pattern acquisition unit 12 acquires part-of-speech differing patterns based on the analysis results (Step S12, Pattern acquisition step), and stores frequency data indicating the number of appearances of each pattern and character string data indicating the character string corresponding to each pattern into the storage unit 13 (Step S13, Storage step).

When a specified number or more of frequency data and character string data are obtained, the candidate specifying unit 14 extracts the part-of-speech differing patterns whose number of appearances is equal to or lower than a predetermined threshold from the storage unit 13 (Step S14, Candidate specifying step). Then, the candidate specifying unit 14 extracts the character strings corresponding to the extracted part-of-speech differing patterns as character strings that contain candidates for an unknown word (Step S15, Candidate specifying step). Finally, the result output unit 15 outputs the extracted character strings (Step S16).

The program (natural language processing program) to cause a computer to execute a series of processes of the natural language processing apparatus 10 described above is provided in the form of being recorded in a static manner on a tangible recording medium such as CD-ROM, DVD, ROM or semiconductor memory, for example. Further, the program may be provided as a data signal superimposed onto a carrier wave through a communication network.

The natural language processing program includes modules equivalent of the functions of the natural language processing apparatus 10 described above, and those modules are read into a computer and executed, so that the above-descried functions are implemented. Note that each module of the natural language processing program may be installed into any of a plurality of computers, not a single computer. In this case, the above-described series of processes are performed by a computer system composed of the plurality of computers.

As described above, according to the embodiment, on the basis of analysis results of one or more common sentences by a plurality of types of morphological analyzers A1, A2 and A3, part-of-speech differing patterns of character strings segmented at common points are obtained. The part-of-speech differing patterns are stored together with their number of appearances. Then, the character strings corresponding to the part-of-speech differing patterns whose number of appearances is equal to or less than a predetermined threshold are specified as those containing candidates for an unknown word. In this manner, by automatically extracting the character strings that are estimated to be likely to contain an unknown word, it is possible to limit the search range for an unknown word and thereby efficiently find an unknown word. The morphological analysis according to this embodiment may be used to recognize words at the initial stage of analysis of a sentence that is written in a language in which a space is not left between words like Japanese. Therefore, the present invention may be applied to processing of not only Japanese but also other languages (for example, Chinese, Korean and the like) that are written with no space between words.

In this embodiment, by use of a plurality of morphological analyzers A1, A2 and A3 having dictionaries with different contents from one another, it is possible to more efficiently extract character strings that actually contain an unknown word, which allows more efficient finding of an unknown word. Such an advantage is obtained also in the case of using a plurality of morphological analyzers A1, A2 and A3 with different inter-word connection rules from one another.

The embodiment of the present invention is described in detail above. However, the present invention is not restricted to the above-described embodiment, and various changes and modifications may be made without departing from the scope of the invention.

REFERENCE SIGNS LIST

A1, A2, A3 . . . morphological analyzer, 10 . . . natural language processing apparatus, 11 . . . result acquisition unit (result acquisition means), 12 . . . pattern acquisition unit (pattern acquisition means), 13 . . . storage unit (storage means), 14 . . . candidate specifying unit (candidate specifying means), 15 . . . result output unit

The invention claimed is:

1. A natural language processing apparatus comprising:
a result acquisition unit for acquiring a plurality of analysis results indicating parts of speech of morphemes contained in one or more common sentences, the analysis results obtained by analyzing the one or more common sentences using a plurality of types of morphological analyzers;
a pattern acquisition unit for detecting a common segmentation point in the plurality of analysis results acquired by the result acquisition unit, extracting one or more parts of speech corresponding to a character string segmented at the common segmentation point from each of the analysis results, and acquiring a set of the extracted one or more parts of speech as a part-of-speech differing pattern;
a storage unit for storing the part-of-speech differing pattern acquired by the pattern acquisition unit together with the number of appearances of the part-of-speech differing pattern; and
a candidate specifying unit for extracting the part-of-speech differing pattern with the number of appearances being equal to or less than a predetermined threshold from the storage unit and specifying the character string corresponding to the extracted part-of-speech differing pattern as a character string containing a candidate for an unknown word.

2. The natural language processing apparatus according to claim 1, wherein
contents of a dictionary stored in each morphological analyzer is different among the plurality of types of morphological analyzers.

3. The natural language processing apparatus according to claim 2, wherein
the number of words included in the dictionary is different among the plurality of types of morphological analyzers.

4. The natural language processing apparatus according to claim 2, wherein
a system of the parts of speech included in the dictionary is different among the plurality of types of morphological analyzers.

5. The natural language processing apparatus according to claim 1, wherein
a connection rule between words stored in each morphological analyzer is different among the plurality of types of morphological analyzers.

6. The natural language processing apparatus according to claim 5, wherein
a score set for a connection between the words is different among the plurality of types of morphological analyzers.

7. The natural language processing apparatus according to claim 5, wherein
a rule to apply a score for a connection between the words is different among the plurality of types of morphological analyzers.

8. A natural language processing method executed by a natural language processing apparatus comprising:
a result acquisition step of acquiring a plurality of analysis results indicating parts of speech of morphemes contained in one or more common sentences, the analysis results obtained by analyzing the one or more common sentences using a plurality of types of morphological analyzers;
a pattern acquisition step of detecting a common segmentation point in the plurality of analysis results acquired in the result acquisition step, extracting one or more parts of speech corresponding to a character string segmented at the common segmentation point from each of the analysis results, and acquiring a set of the extracted one or more parts of speech as a part-of-speech differing pattern;
a storage step of storing the part-of-speech differing pattern acquired in the pattern acquisition step together with the number of appearances of the part-of-speech differing pattern into a storage unit; and
a candidate specifying step of extracting the part-of-speech differing pattern with the number of appearances being equal to or less than a predetermined threshold from the storage unit and specifying the character string corresponding to the extracted part-of-speech differing pattern as a character string containing a candidate for an unknown word.

9. A non-transitory computer-readable recording medium storing a natural language processing program causing a computer to function as:
a result acquisition unit for acquiring a plurality of analysis results indicating parts of speech of morphemes contained in one or more common sentences, the analysis results obtained by analyzing the one or more common sentences using a plurality of types of morphological analyzers;
a pattern acquisition unit for detecting a common segmentation point in the plurality of analysis results acquired by the result acquisition unit, extracting one or more parts of speech corresponding to a character string segmented at the common segmentation point from each of the analysis results, and acquiring a set of the extracted one or more parts of speech as a part-of-speech differing pattern;
a storage unit for storing the part-of-speech differing pattern acquired by the pattern acquisition unit together with the number of appearances of the part-of-speech differing pattern; and
a candidate specifying unit for extracting the part-of-speech differing pattern with the number of appearances being equal to or less than a predetermined threshold from the storage unit and specifying the character string corresponding to the extracted part-of-speech differing pattern as a character string containing a candidate for an unknown word.

* * * * *